United States Patent [19]

Omori et al.

[11] 4,006,620
[45] Feb. 8, 1977

[54] DEVICE FOR SHAPING AND TRANSPORTING COIL FASTENER ELEMENTS

[75] Inventors: Shigenori Omori; Fumio Terada, both of Uozu, Japan

[73] Assignee: Yoshida Kogyo Kabushiki Kaisha, Japan

[22] Filed: Aug. 25, 1975

[21] Appl. No.: 607,235

[30] Foreign Application Priority Data

Sept. 5, 1974 Japan .......................... 49-102234

[52] U.S. Cl. ...................................... 72/66; 72/145
[51] Int. Cl.[2] ...................... B21D 11/00; B21F 3/04
[58] Field of Search ............ 72/66, 142, 143, 145; 140/92.93, 92.94

[56] References Cited

UNITED STATES PATENTS

| | | | |
|---|---|---|---|
| 1,382,251 | 6/1921 | Smurr | 72/66 |
| 1,617,583 | 2/1927 | Fentress et al. | 72/66 X |
| 1,898,102 | 2/1933 | Sturgis | 72/145 |
| 3,353,217 | 11/1967 | Bashover | 72/66 X |

FOREIGN PATENTS OR APPLICATIONS 2,010,428   2/1970   France .................................. 77/66

*Primary Examiner*—Leon Gilden
*Attorney, Agent, or Firm*—Bucknam and Archer

[57] ABSTRACT

A device for shaping and transporting coil fastener elements which comprises a rotatable screw and an oppositely disposed rotating means having an endlessly toothed periphery. A mandrel of a coiling unit is arranged between the rotating screw and the rotating means with its extension curved in conformity with the periphery of the rotating means. Convolutions formed successively around the mandrel are shaped and transported between screws and rotating means and, upon departure and disengagement from the screw, are continued to advance in driving engagement with the rotating means toward a die wheel whereby they are finally set with heat.

3 Claims, 2 Drawing Figures

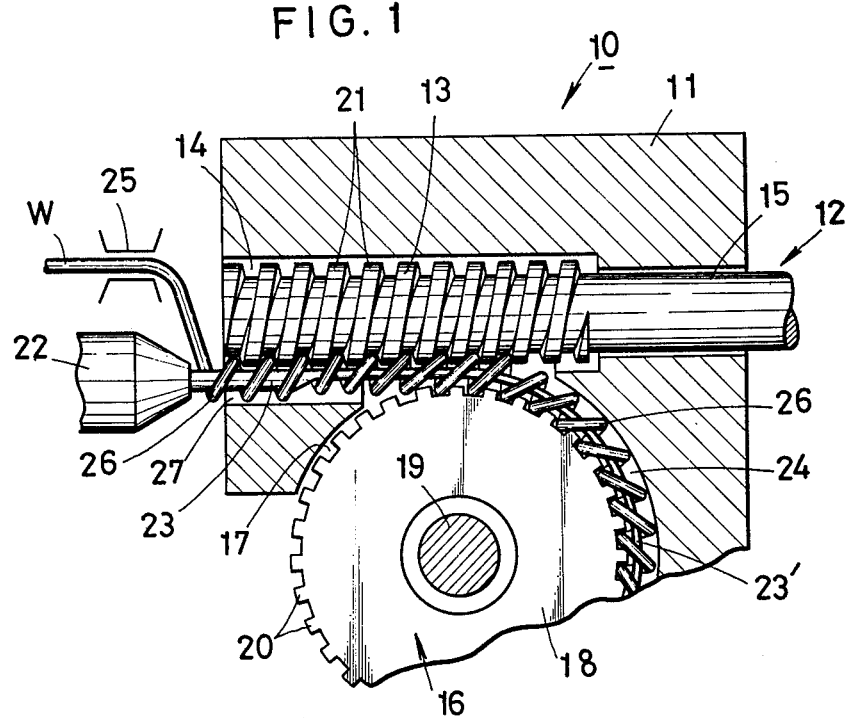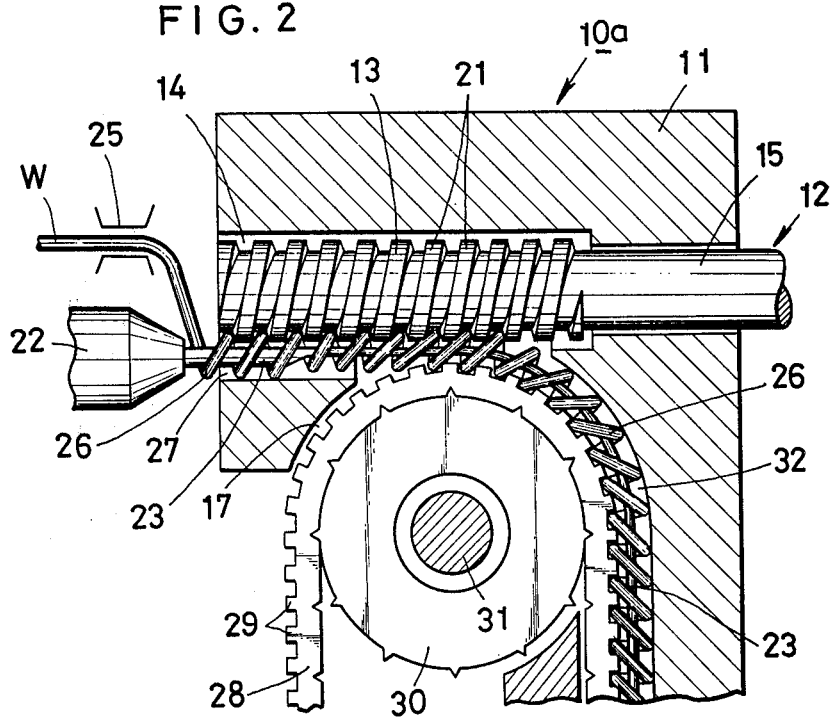

DEVICE FOR SHAPING AND TRANSPORTING COIL FASTENER ELEMENTS

BACKGROUND OF THE INVENTION

The present invention relates generally to apparatus for manufacturing helically coiled continuous elements for a slide fastener and more particularly to a device for shaping and transporting such fastener elements at increased rate of speed.

As is well known in the art, slide fastener elements in the form of a helical coil are formed by winding a starting linear filament around a mandrel in a coiling machine and set with heat while the filament is progressively advanced. A prior art device for this operation was provided generally with a pair of spaced, parallel screws rotatable on opposite sides of a mandrel and adapted to shape and advance the filament as the latter is progressively coiled around the mandrel. However, the device has suffered from the drawback that screws of the type described rely for their rotation on a relatively small drive member such for example as gear wheel, spindle and the like, which lacks sufficient mechanical strength to withstand at high speed revolution. Another deficiency of this prior art device was that since the screws as well as the mandrel need be long enough to provide sufficient length of time for the heat-setting of fastener elements on these components when operated at high speed, the mandrel becomes susceptible to torsion and is further subjected to severe sliding friction when moving forward the fastener element. Therefore, such prior art device was not suitable for high-speed operation and imposed limitations to the size of the fastener element that can be produced thereby.

SUMMARY OF THE INVENTION

With the above-noted prior art drawbacks in view, the present invention has for its object to provide an improved device for shaping and transporting a coil fastener element which is highly durable and reliable for operation at increased rate of speed.

Briefly stated, there is provided a device for shaping and transporting a coil fastener element which comprises a frame, a screw rotatably mounted in a first cavity formed in said frame, rotating means having an endlessly toothed periphery and rotatably mounted in a second cavity formed in said frame and communicating with said first cavity, and a mandrel interposed between said screw and said rotating means and extending in conformity with the periphery of said rotating means.

The device according to the invention includes a rotatable screw and oppositely disposed rotating means having an endlessly toothed periphery. Continuous convolutions formed helically from a linear filament are shaped between and transported by the rotatable screw and the rotating means. Upon departure or disengagement from the screw, the coiled filament is continued to advance in driving engagement with the toothed periphery of the rotating means toward a suitable die wheel whereby they are finally set with heat. This arrangement makes it possible to reduce the length of the screw and at the same time increase its diameter. A mandrel around which the convolutions are continuously formed is arranged between the rotatable screw and the rotating means and has its extension extending along the toothed periphery of the rotating means. The portion of the mandrel which is located adjacent the screw can be also reduced in length and hence its torsion can be held to an absolute minimum. This makes it possible to reduce the overall size of the mandrel to permit the production at high speed of continuous coiled fastener elements of relatively small size without breaking, deforming or otherwise damaging the mandrel.

Other objects and advantages will become apparent from the following description in conjunction with the accompanying drawing which illustrates by way of example a preferred embodiment and in which like reference numerals or characters refer to like parts throughout the views.

BRIEF DESCRIPTION OF THE DRAWINGS

FIG. 1 is a longitudinal cross-sectional view of a device provided in accordance with the invention; and FIG. 2 is a longitudinal cross-section view of a modification of the device of FIG. 1.

DESCRIPTION OF THE PREFERRED EMBODIMENTS

Referring now to FIG. 1, there is shown a device 10 embodying the invention for shaping and simultaneously transporting a coil type slidable fastener element, which device comprises a frame 11, a rotatable screw 12 having a threaded section 13 housed in a first cavity 14 formed in the frame 11 and a blank shaft section 15 journaled for rotation in the frame 11, and rotating means 16 rotatable within a second cavity 17 formed in the frame 11 and communicating with the first cavity 14. The rotating means 16 is shown in the embodiment of FIG. 1 as comprising a feed gear 18 mounted for rotation on a shaft 19 and disposed in opposed relation to the threaded section 13 of the rotatable screw 12. Formed around the periphery of the gear 18 are teeth 20 spaced apart from each other by a distance equal to a pitch between adjacent screw threads 21 of the threaded section 13 of the rotatable screw 12. A mandrel holder 22 in a filament coiling unit (not shown) has connected therewith a mandrel 23 interposed between the threaded section 13 and the gear 18, with its extension 23' disposed in a guide space 24 and curved in conformity with the periphery of the gear 18. Although not shown, there is a reinforcing or filler cord inserted in and throughout the entire length of the mandrel 23 to go with the coil element. The filament W is wound around the mandrel 23 by means of a schematically shown rotating member 25 operatively associated with the coiling unit and is thereby formed into continuous convolutions 26 which are introduced from a port 27 in the first cavity 14. Advancement of the convolutions 26 of the filament W is effected as the same is driven in meshing engagement between the threads 21 of the screw 12 and the teeth 20 of the gear 18. The portion of convolutions 26 which has moved past the terminal of the screw threads 21 is caught by the teeth 20 of the feed gear 18 and continued to advance through the guide space 24 into a shaping unit comprising for example a die wheel, not shown, wherein the coiled fastener element is set with heat. Advantageously, the feed gear 18 being sectionally circular can forward the coiled filament smoothly to a similarly circular die wheel. The convolutions 26 of the filament W may conveniently be heated while travelling along and between the screw threads 21 and the teeth 20 to facilitate final heat setting treatment.

FIG. 2 shows another embodiment of the device 10a wherein an endless belt 28 made of heat-resistant material such as for example an urethane resin and having teeth 29 formed on its outer surface and spaced by a distance equal to a pitch of screw threads 21 of the screw 12 is trained around a sprocket 30 supported for rotation about a shaft 31. This belt-and-sprocket arrangement has a function substantially similar to the feed gear 18 employed in the first embodiment of FIG. 1 but advantageously provides more of the guide space 32 so that the convolutions 26 of the filament W can be more effectively set in shape.

From the foregoing, the artisan will appreciate that in the device 10, the screw 12 is rotatable about its longitudinal axis relative to the frame 11 and the rotating means 16, or more accurately a carrier means, rotates about an axis generally transverse to the longitudinal axis of the screw 12, and this relationship applies also to the FIG. 2 embodiment wherein the circulatory movement of the endless belt 28 is in effect a rotation thereof about an axis parallel to the rotation axis of the drive shaft 31, which axis is likewise transverse to the screw 12 axis.

In both embodiments of the invention, the mandrel 23 extends lengthwise first along a portion of the screw 12 to convey the fastener element with the coils 26 thereof in engagement with the threads 13 of screw 12, and then mandrel 23 extends lengthwise along at least a portion of the curved path along which the teeth of the carrier means move. The portion of mandrel 23 extending along such curved path serves to convey the fastener element with the coils 26 thereof in engagement with the peripheral teeth 20 or 29 of the carrier means and away from the screw 12 in a direction transverse to the longitudinal axis thereof.

What is claimed is:

1. A device for shaping and transporting a coil fastener element which comprises a frame, a screw mounted in a first cavity formed in said frame, said screw being rotatable about its longitudinal axis relative to the frame; carrier means having an endless toothed periphery and mounted in a second cavity formed in said frame and communicating with said first cavity, said carrier means being rotatable relative to the frame about an axis generally transverse to the longitudinal axis of said screw to move the peripheral teeth of the carrier means along a curved path passing in adjacent spaced-apart relation to the threads of said screw, said scew and carrier means being positioned to engage said fastener element coil and shape same; and a mandrel interposed between said carrier means and said screw, said mandrel being disposed to accommodate the winding thereabout of a filament to form a continuous coil fastener element, said mandrel extending lengthwise first along a portion of said screw to convey said fastener element with the coils thereof in engagement with the threads of the screw, and then extending lengthwise along at least a portion of said curved path to convey said fastener element with the coils thereof in engagement with the peripheral teeth of the carrier means and away from said screw in a direction transverse to the longitudinal axis thereof.

2. A device according to claim 1 wherein said carrier means comprises a gear having peripheral teeth spaced apart from one another by a distance equal to the pitch of the threads on said screw.

3. A device according to claim 1 wherein said carrier means comprises an endless belt having on its outer periphery a succession of teeth spaced apart from one another by a distance equal to the pitch of the threads on said screw, and a sprocket disposed to rotatably drive said belt.

* * * * *